United States Patent [19]

Neeff et al.

[11] 3,980,609
[45] Sept. 14, 1976

[54] PROCESS FOR THE BULK DYEING OF POLYESTERS
[75] Inventors: Rutger Neeff; Heinz Dietrich Jordan, both of Leverkusen, Germany
[73] Assignee: Bayer Aktiengesellschaft, Leverkusen, Germany
[22] Filed: Apr. 28, 1975
[21] Appl. No.: 572,325

[30] Foreign Application Priority Data
May 3, 1974 Germany............................ 2421375

[52] U.S. Cl. ............................. 260/40 P; 260/278
[51] Int. Cl.² .......................................... C08L 67/00
[58] Field of Search ........................... 260/40 P, 278

[56] References Cited
UNITED STATES PATENTS

| | | | |
|---|---|---|---|
| 2,195,067 | 3/1940 | Weinoud et al. ................. | 260/278 |
| 2,571,319 | 10/1951 | Waters et al. ..................... | 260/40 P |
| 3,324,131 | 6/1967 | Genta ................................ | 260/278 |
| 3,767,680 | 10/1973 | Källiker et al. .................. | 260/278 X |
| 3,939,113 | 2/1976 | Wick et al. ....................... | 260/40 P |

Primary Examiner—Lewis T. Jacobs
Assistant Examiner—S. M. Person
Attorney, Agent, or Firm—Plumley & Tyner

[57] ABSTRACT

Dyestuffs of the formula

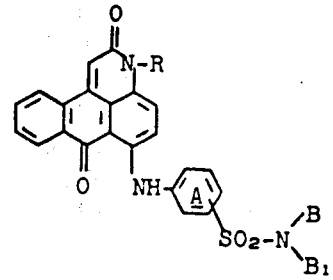

wherein
R denotes a straight-chain or branched-chain alkyl group with 1–4 C atoms,
B and $B_1$ independently of one another denote hydrogen or optionally substituted alkyl, alkenyl, cycloalkyl, aralkyl, aryl or heteroaryl radicals or conjointly and together with the N atom form a ring which is optionally interrupted by hetero-atoms and the ring A can be substituted by 1 - 3 non-ionic substituents,
are suitable for the bulk dyeing of synthetic linear polyester.

5 Claims, No Drawings

PROCESS FOR THE BULK DYEING OF POLYESTERS

The subject of the invention is a process for bulk dyeing synthetic linear polyesters with one or more dyestuffs of the formula

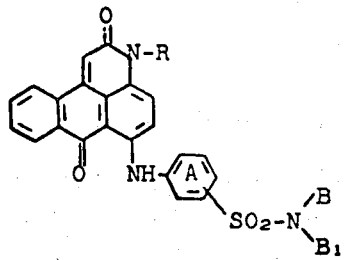

(I)

wherein
R denotes a straight-chain or branched-chain alkyl group with 1–4 C atoms,
B and $B_1$ independently of one another denote hydrogen or optionally substituted alkyl, alkenyl, cycloalkyl, aralkyl, aryl or heteroaryl radicals or conjointly and together with the N atom form a ring which is optionally interrupted by hetero-atoms and the ring A can be substituted by 1 - 3 non-ionic substituents.

Up to the present, only a limited number of dyestuffs are available for dyeing linear polyesters, especially for the production of fibres in transparent colours. Very many of the dyestuffs known for dyeing plastics are unsuitable for dyeing linear polyesters because these dyestuffs, on addition to the condensation melt or before spinning, lose their colour shade, their fastness properties or other desired properties as a result of the high temperatures of 290°–300°C and of the added catalysts such as, for example, phosphoric acid, manganese acetate and antimony trioxide. Since most organic pigments are also not stable under the conditions which arise in the course of the preparation or processing of linear polyesters, inorganic pigments have been used for colouring these products, but these give pale and cloudy colour shades, without the clarity and transparency desired for many purposes.

It has now been found, surprisingly, that with the dyestuffs of th formula I clear, deep, transparent and very fast dyeings are obtained when bulk-dyeing linear polyesters.

Suitable radicals R are the methyl, ethyl, propyl, isopropyl, butyl or isobutyl group.

The ring A can be substituted by 1–3 non-ionic substituents, such as, for example, halogen atoms, such as fluorine, chlorine or bromine, straight-chain or branched-chain alkyl groups with 1 to 4 C atoms, such as the methyl, ethyl, propyl, i-propyl, butyl, i-butyl or tert.-butyl group, alkoxy groups, preferably $C_1$–$C_4$-alkoxy groups, such as the methoxy, ethoxy, propoxy or butoxy group, trifluoromethyl groups and difluoromethyl groups, alkylsulphonyl groups, especially those with 1 to 4 C atoms, aralkoxy groups, preferably benzyloxy radicals, and aryloxy groups, especially phenoxy groups, the benzyloxy and phenoxy groups optionally being substitued further by halogen atoms, $C_1$–$C_4$-alkyl groups and $C_1$–$C_4$-alkoxy groups.

Examples of suitable radicals B and $B_1$ are hydrogen, alkyl with 1 – 12 C atoms, alkenyl with 2 – 12 C atoms and cycloalkyl with 5 – 7 C atoms, which can be monosubstituted by hydroxyl, chlorine, bromine, methoxy, ethoxy, methylthio, methylsulphonyl, hydroxyethoxy, nitrile, methoxyethoxy or ethoxyethoxy, for example methyl, ethyl, propyl, i-propyl, butyl, i-butyl, tert.-butyl, amyl, octyl, dodecyl, $\beta$-hydroxyethyl, $\beta$-chloroethyl, $\beta$-bromoethyl, $\beta$-methoxyethyl, $\beta\beta$-ethoxyethyl, $\beta$-methylthioethyl, $\beta$-methylsulphonylethyl or $\beta$-cyanoethyl, $\gamma$-hydroxypropyl, 2-($\beta$-hydroxyethoxy)-ethyl, 2-($\beta$-methoxyethoxy)-ethyl, 2-($\beta$-ethoxyethoxy)-ethyl, cyclopentyl, cyclohexyl, vinyl, $\beta$-chlorovinyl or $\beta$-bromovinyl or allyl.

Further examples of suitable radicals B and $B_1$ are benzyl or phenylethyl which are optionally substituted by halogen, $C_1$–$C_4$-alkyl or $C_1$–$C_4$-alkoxy, or phenyl radicals optionally substituted by one or more halogen atoms, such as fluorine, chlorine or bromine, nitro groups, trifluoromethyl, hydroxyl or $C_1$–$C_4$-alkoxy radicals, carboxyl or carboxylic acid amide groups, acylamino groups, sulphonamide radicals or $C_1$–$C_4$-alkylsulphonyl radicals, wnerein acyl for example represents $C_1$–$C_4$-alkylcarbonyl and $C_1$–$C_4$alkylsulphonyl, or represents benzoyl and benzenesulphonyl optionally substituted by methyl, methoxy, chlorine, bromine, nitrile or nitro.

Examples of possible heteroaryl radicals B and $B_1$ are pyridyl, pyrrolyl, pyrimidinyl, furanyl, thienyl or 3-sulpholanyl. Examples to be mentioned of rings, optionally interrupted by hetero-atoms, which B and $B_1$ can form together with the N atom are pyrrolidinyl, piperidinyl, morpholinyl, thiomorpholinyl or 5,5-dioxothiomorpholinyl.

Preferred dyestuffs correspond to the formula

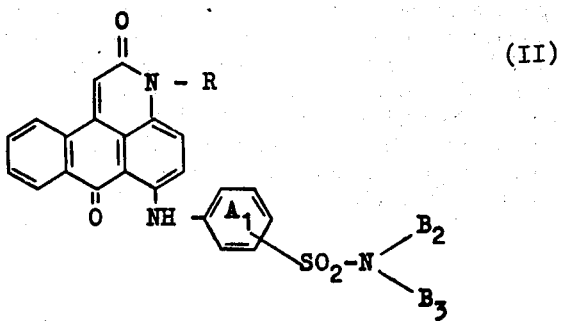

(II)

wherein
R has the abovementioned meaning,
$A_1$ can be substituted by 1 to 3, especially 1, substituents from the series F, Cl, Br, $C_1$–$C_4$-alkyl, $C_1$–$C_4$-alkoxy, $CHF_2$, $CF_3$ or $SO_2CH_3$ and $B_2$ and $B_3$ denote $C_1$–$C_{12}$-alkyl; allyl; hydroxyethyl, methoxyethyl, ethoxyethyl, hydroxyethoxyethyl, cyanoethyl, benzyl, or phenyl optionally substituted by hydroxyl, $C_1$–$C_4$-alkoxy, $C_1$–$C_4$-alkyl, chlorine, bromine, $C_2$–$C_5$-alkoxycarbonyl, carboxyl, carbamoyl or sulphamoyl, sulpholanyl, cyclohexyl, cyclopentyl or, together with the N atom, piperidinyl, pyrrolidinyl or morpholinyl.

The dyestuffs of the formula (I), containing sulphonamide groups, are prepared in the usual manner, for example by converting the corresponding N-alkylarylamino-anthrapyridones into corresponding sulphochlorides with chlorosulphonic acid/thionyl chloride and reacting these sulphochlorides with suitable amino compounds, or by converting the corresponding sulphonic acids into the corresponding amides via reactive intermediate stages such as, for example, the esters or acid chlorides.

Linear polyesters used are, in particular, linear aromatic polyesters such as polyethylene terephthalate or polyesters of terephthalic acid and 1,4-bis-(hydroxymethyl)- cyclohexane, and also basic-modified or acid-modified linear aromatic polyesters, such as polyethylene terephthalate modified with sulpho-isophthalic acid.

To carry out the process it is possible, for example, to add one or more of the dyestuffs according to the invention to a condensation melt of dimethyl terephthalalte, ethylene glycol and a manganese acetate/phosphoric acid catalyst, complete the condensation in the usual manner and spin the dyed melt to form filaments or mould it to form solid articles.

However it is also possible to mix one or more of the dyestuffs mentioned in the usual manner with the finished linear polyesters and then to produce the dyed polyesters by a spinning process or moulding process. For this purpose, the material to be dyed, in the form of powders, granules or chips, is mixed with the finely divided dry dyestuff, for example in a lacquering drum, so that the surface of the material is covered with a layer of the dyestuff, after which the polyester particles covered with dyestuff can be fused and spun or moulded in accordance with known processes. The polyester particles can optionally also be covered with dyestuff by using a dispersion of the dyestuff in a volatile liquid such as water or alcohol and preferably evaporating off the volatile liquid before fusing the polyester particles covered with dyestuff.

The compounds according to the invention are surprisingly stable under the conditions prevailing in the condensation melt during the preparation of the linear polyesters, and surprisingly stable during the spinning process, do not alter the viscosity of the polyester melt and do not impair the properties of the linear polyesters, and of the fibres produced therefrom, even in the case of deep colourations. The linear polyesters dyed in accordance with the invention exhibit attractive, clear and transparent colour shades which have very good fastness properties.

EXAMPLE 1a:

99 parts of polyethylene terephthalate in the form of pellets are mixed with 1 part of finely divided dyestuff of the formula

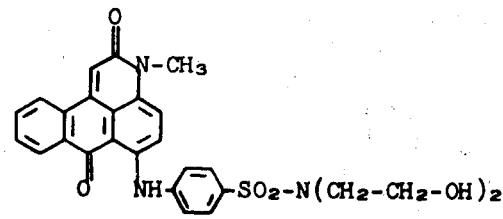

in a drum, until the polyester particles are uniformly covered with dyestuff. The resulting mixture is fused and is then spun in the usual manner at 290°–295°C.

The filament thus obtained is dyed in clear bluish-tinged red shades. The dyeing exhibits excellent fastness to light, washing and heat-setting.

EXAMPLE 1b:

The dyestuff used can be prepared as follows:

15 parts of N-methyl-4-phenylamino-anthrapyridone are dissolved in 76 parts of chlorosulphonic acid, 22.5 parts of thionyl chloride are added dropwise at 20°–25°C and the mixture is stirred for 3 hours at 20°–25°C. The melt is now poured onto ice and the precipitate which has separated out is filtered off and washed with ice water until neutral. The resulting product, whilst still moist, is introduced into a mixture of 11 parts of diethanolamine and 156 parts of ethanol and the whole is stirred for 6 hours at 40°C. After filtration and washing with ethanol and water, 20 parts of the dyestuff mentioned in Example 1a = 90% of theory are obtained.

If, in the production of dyed polyester filaments according to Example 1a, the dyestuff mentioned in Example 1a is replaced by corresponding amounts of the dyestuffs listeed in the table which follows, polyester filmanets dyed in clear bluish-tinged red shades of excellent fastness to light, washing and heat-setting are obtained.

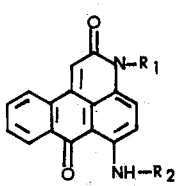

| Example | $R_1$ | $R_2$ |
|---|---|---|
| 2 | $CH_3$ | ⟨C₆H₄⟩—$SO_2$—$NH_2$ |
| 3 | $CH_3$ | ⟨C₆H₄⟩—$SO_2$—NH—$CH_3$ |
| 4 | $CH_3$ | ⟨C₆H₃⟩(Cl)—$SO_2$—$N(CH_3)_2$ |

-continued
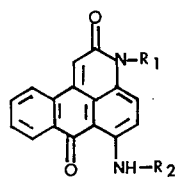
| Example | R₁ | R₂ |
|---|---|---|
| 5 | CH₃ | 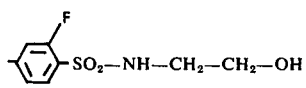 |
| 6 | CH₃ | 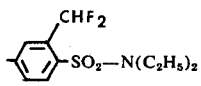 |
| 7 | CH₃ | 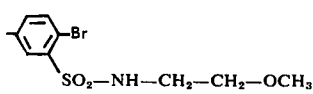 |
| 8 | CH₃ | 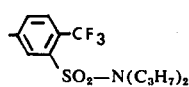 |
| 9 | CH₃ | 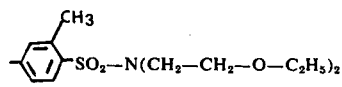 |
| 10 | CH₃ | 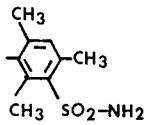 |
| 11 | CH₃ | 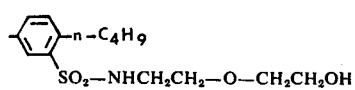 |
| 12 | CH₃ | 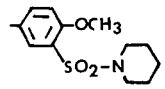 |
| 13 | CH₃ | 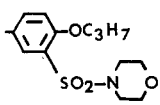 |
| 14 | C₂H₅ | 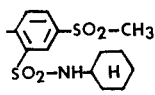 |

-continued
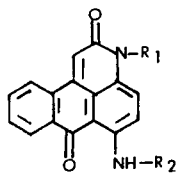
| Example | R₁ | R₂ |
|---|---|---|
| 15 | CH₃ |  |
| 16 | -CH(CH₃)₂ |  |
| 17 | CH₃ | 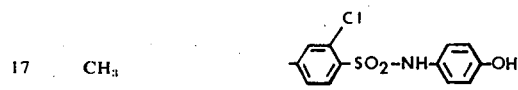 |
| 18 | CH₃ | 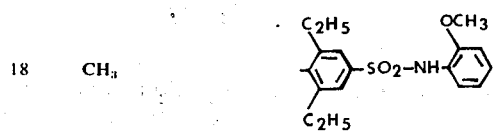 |
| 19 | CH₃ | 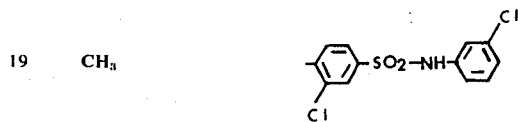 |
| 20 | -CH₂-CH(CH₃)₂ | 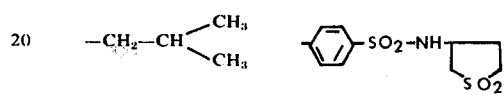 |
| 21 | -CH₂-CH(CH₃)₂ | 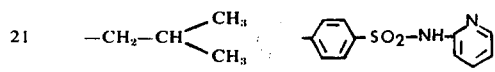 |
| 22 | CH₃ | 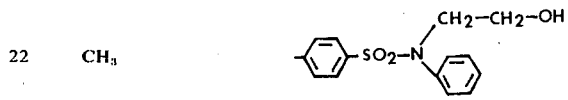 |
| 23 | CH₃ | 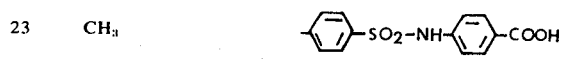 |
| 24 | CH₃ | 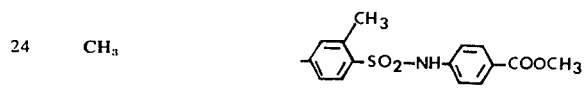 |

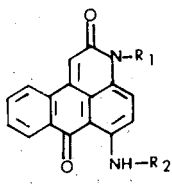

| Example | $R_1$ | $R_2$ |
|---------|-------|-------|
| 25 | $CH_3$ | 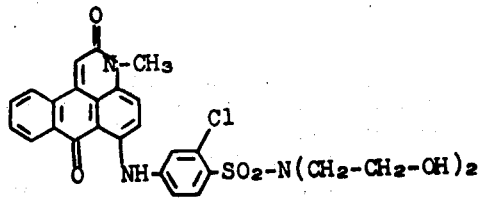 |

EXAMPLE 26a:

100 parts of terephthalic acid dimethyl ester, 71 parts of ethylene glycol, 0.05 parts of manganese(II) acetate and 0.04 part of phosphoric acid are stirred for 4 hours at 197°C whilst distilling off the methanol. 3 parts of the dyestuff of the formula

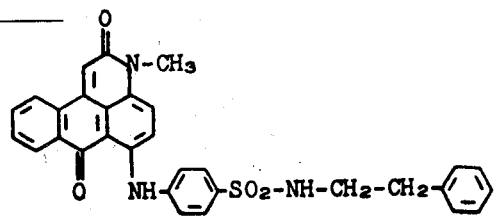

in 12 parts of ethylene glycol are now added and the condensation is completed in 6 hours at 277°C and 0.3 mm Hg, whilst distilling off the excess ethylene glycol. On spinning the melt in the customary way, clear bluish-tinged red filaments are obtained, the dyeing of which has excellent fastness to light, washing and heat-setting.

EXAMPLE 26b:

The dyestuff used can be prepared as follows:

15 parts of N-methyl-4-(3-chlorophenylamino)-anthrapyridone are dissolved in 76 g of chlorosulphonic acid and 22.5 parts of thionyl chloride are added in 1 hour at 20°–25°C. After stirring for 3 hours at 20°–25°C, the melt is poured out onto ice and the precipitate which has separated out is filtered off and washed with ice water until neutral. The resulting product, whilst still moist, is introduced into a mixture of 200 parts of water and 10 parts of diethanolamine and the whole is stirred at 20°–25°C until sulphochloride is no longer detectable chromatographically. The product is filtered off and washed with water, and after drying 20.4 parts of the dyestuff mentioned in Example 26a =95% of theory are obtained.

EXAMPLE 27:

99 parts of the polyester from terephthalic acid and 1,4-bis-(hydroxymethyl)-cyclohexane in the form of chips, are mixed with one part of finely divided

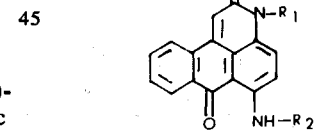

until the polyester particles are uniformly covered. The resulting mixture is fused and customary spinning at 290°–295°C gives a filament dyed in a clear bluish-tinged red which has excellent fastness to light, washing and heat-setting.

If, in the production of dyed polyester filaments according to Example 27, the dyestuff mentioned in Example 27 is replaced by corresponding amounts of the dyestuffs listed in the table which follows, polyester filaments dyed in clear bluish-tinged red shades of excellent fastness to light, washing and heat-setting are obtained.

| Example | $R_1$ | $R_2$ |
|---------|-------|-------|
| 28 | $CH_3$ | 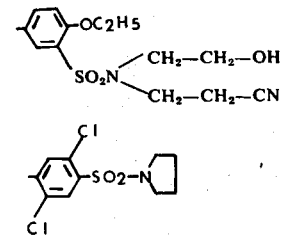 |
| 29 | $C_2H_5$ | |
| 30 | $CH_3$ | 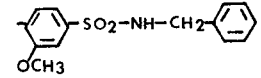 |

-continued

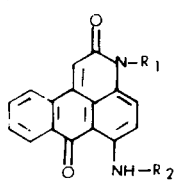

| Example | R₁ | R₂ |
|---|---|---|
| 31 | CH₃ | 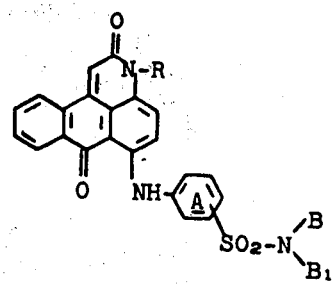 |
| 32 | CH₃ | |
| 33 | CH₃ | |
| 34 | CH₃ | |
| 35 | —CH(CH₃)₂ | |
| 36 | CH₃ | |
| 37 | CH₃ | |

We claim:

1. Process for bulk dyeing synthetic linear polyesters, characterised in that one or more dyestuffs of the formula wherein
R denotes a straight-chain or branched-chain alkyl group with 1–4 C atoms,
B and B₁ independently of one another denote hydrogen or optionally substituted alkyl, alkenyl, cycloalkyl, aralkyl, aryl or heteroaryl radicals or conjointly and together with the N atom form a ring which is optionally interrupted by hetero-atoms and the ring A can be substituted by 1 – 3 non-ionic substituents,
are used.

2. Process according to claim 1, characterised in that one or more dyestuffs of the formula

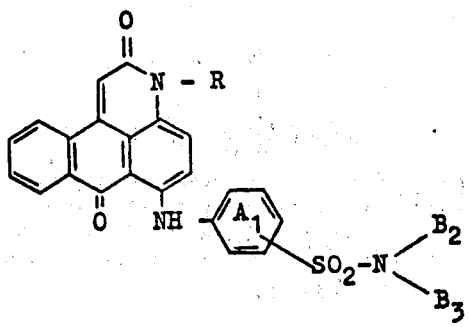

wherein
R has the abovementioned meaning,
A₁ can be substituted by 1 to 3, especially 1, substituents from the series F, Cl, Br, $C_1$–$C_4$-alkyl, $C_1$–$C_4$-alkoxy, $CHF_2$, $CF_3$ or $SO_2CH_3$ and
B₂ and B₃ denote $C_1$–$C_{12}$-alkyl, allyl, hydroxyethyl, methoxyethyl, ethoxyethyl, hydroxyethoxyethyl, cyanoethyl, benzyl, or phenyl optionally substituted by hydroxyl, $C_1$–$C_4$-alkoxy, $C_1$–$C_4$-alkyl, chlorine, bromine, $C_2$–$C_5$-alkoxycarbonyl, carboxyl, carbamoyl or sulphamoyl, sulpholanyl, cyclohexyl, cyclopentyl or, together with the N atom, piperidinyl, pyrrolidinyl or morpholinyl, are used.

3. Synthetic linear polyesters bulk-dyed according to claim 1.

4. The process of claim 1 in which the dyestuff is

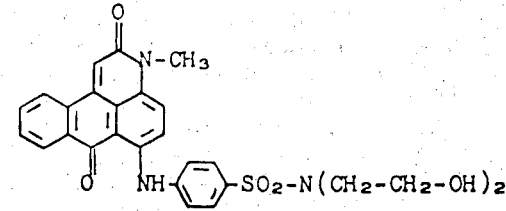

5. The process of claim 1 in which the dyestuff is

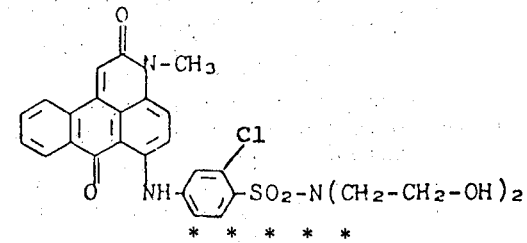

* * * * *